2,747,274

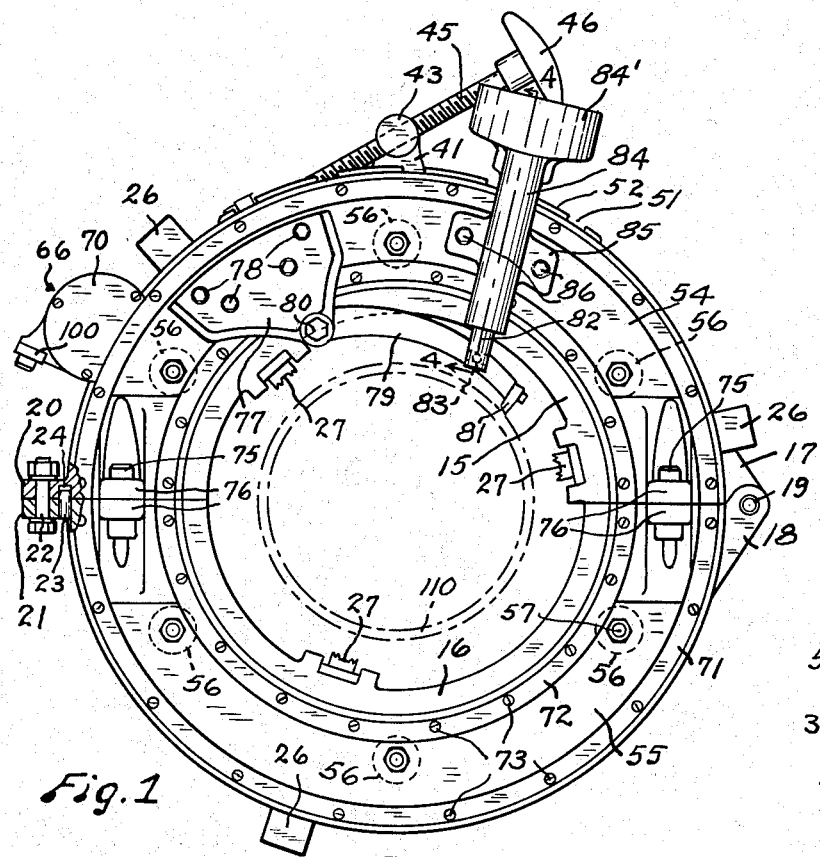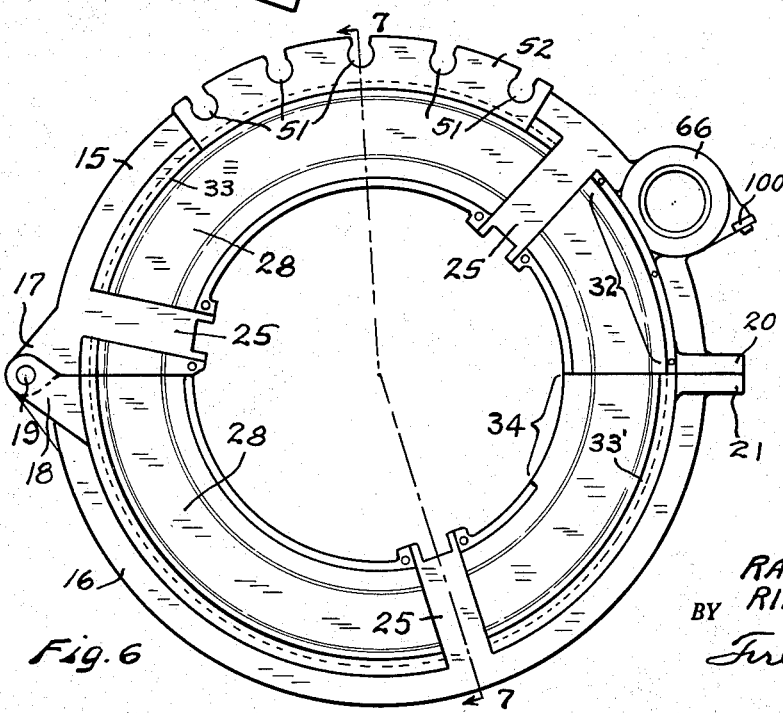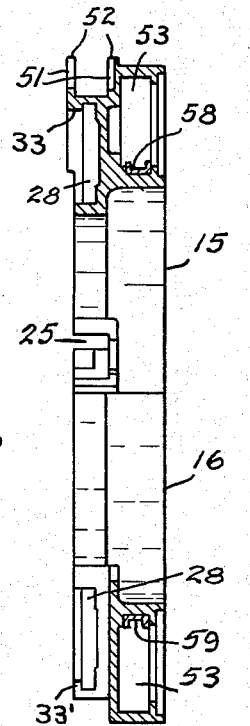

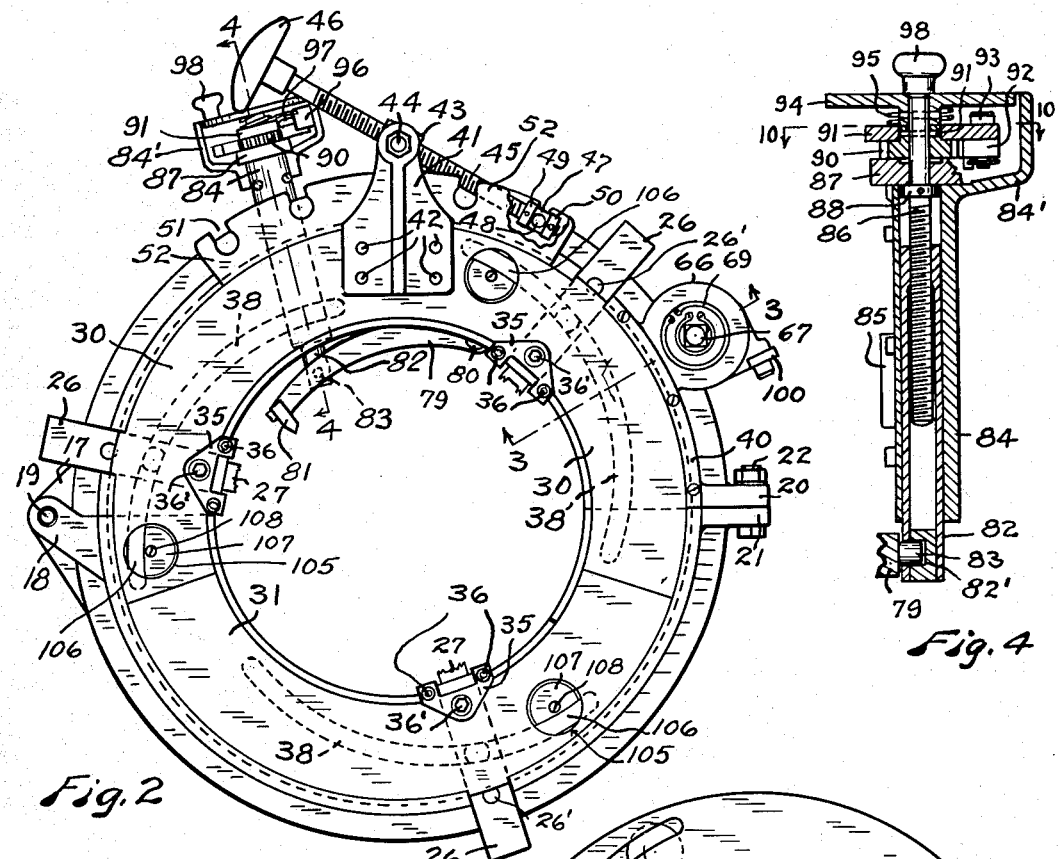
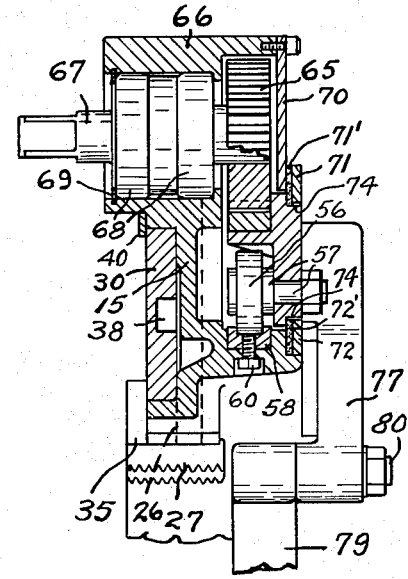
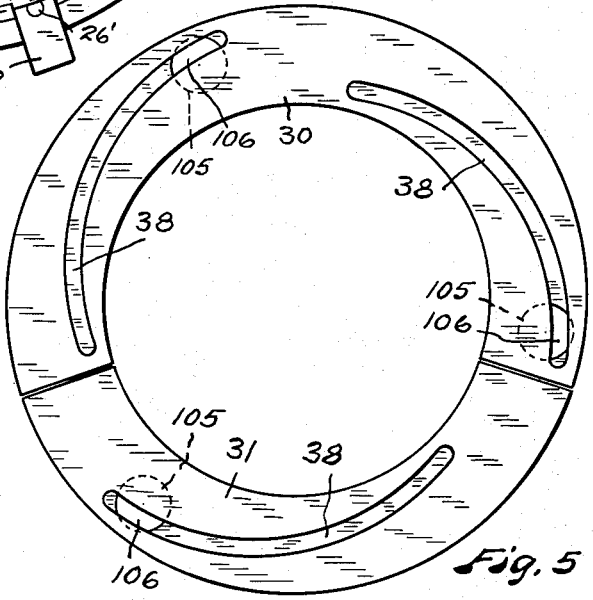
INVENTORS
RALPH J. WILLARD
RILEY T. BROWN
BY Fred C. Matheny
ATTORNEY

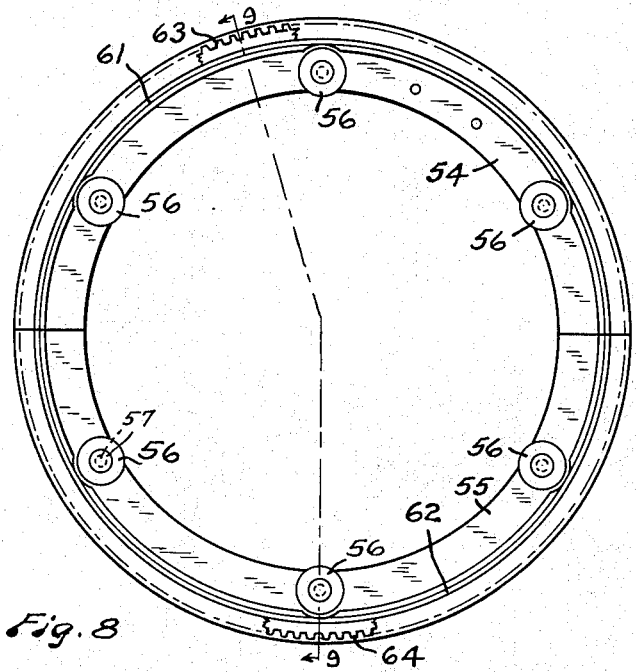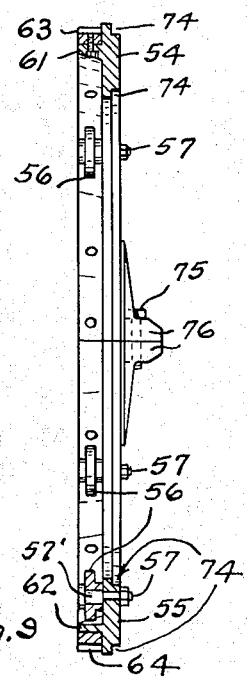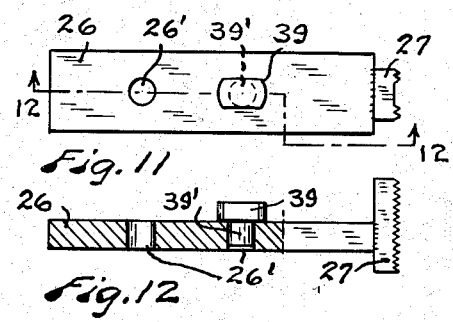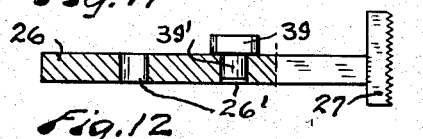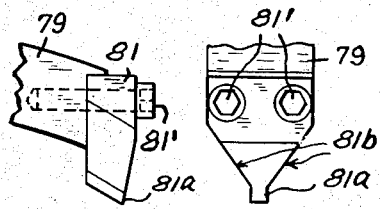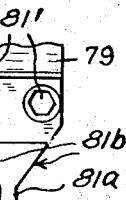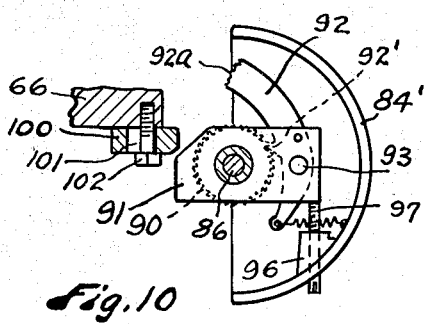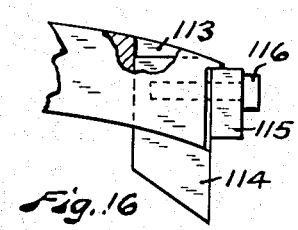
INVENTORS
RALPH J. WILLARD
RILEY T. BROWN
BY Fred C. Matheny
ATTORNEY United States Patent Office 2,747,274
Patented May 29, 1956

POWER OPERATED PIPE CUTTER

Ralph J. Willard, Seattle, and Riley T. Brown, Medina, Wash., assignors to Spring Load Manufacturing Corp., Seattle, Wash., a corporation of Washington Application May 18, 1953, Serial No. 355,568

6 Claims. (Cl. 30—97)

This invention relates to a power operated pipe cutter.

An object of this invention is to provide a power operated pipe cutter which can be applied to a pipe from the side of the pipe and without inserting the pipe through the cutter or passing the cutter over an end of the pipe, thus making the cutter applicable to pipe without disjointing the pipe.

Another object is to provide a pipe cutter comprising a frame ring formed of at least two arcuate sections which are pivotally connected together at one location and detachably connected together at another location, whereby said frame ring may be opened up to apply it to a pipe from the side of the pipe, said frame ring sections being provided with self centering pipe gripping jaws and having a sectional tool carrying ring rotatively mounted therein.

Another object of this invention is to provide a power operated pipe cutter which is particularly well adapted for cutting off or grooving large heavy pipes but which may also be used on small pipes to advantage.

Another object is to provide a pipe cutter which can be used to bevel the ends of pipe as it cuts the pipe off, thus leaving the cut-off ends of the pipe in proper shape for joining them by welding and which may further be used to cut the pipe off squarely and with non-beveled ends or to annularly groove the outer circumferential wall of the pipe.

Other objects of the invention are to provide a power operated pipe cutter capable of use on relatively large pipe and which is not excessively heavy and is readily portable and is strong and durable and easy to use and fast and efficient in operation and which will save time and labor and expense in cutting and forming pipes.

Other objects of this invention will be apparent from the following description taken in connection with the accompanying drawings.

In the drawings—

Figure 1 is a view in elevation showing one side of a power operated pipe cutter constructed in accordance with this invention.

Fig. 2 is a similar view in elevation showing the other side of the pipe cutter.

Fig. 3 is a view in cross section taken substantially on broken line 3—3 of Fig. 2 and on a larger scale than Fig. 2, parts being shown in elevation and parts being broken away.

Fig. 4 is a detached view in elevation of tool feeding means, taken substantially on broken lines 4—4 of Figs. 1 and 2 but omitting the pipe cutter.

Fig. 5 is a detached elevational view showing the inner side of a two piece annular cam plate.

Fig. 6 is a detached elevational view showing the cam plate receiving side of a two piece frame ring.

Fig. 7 is a sectional view of said two piece frame ring taken substantially on broken line 7—7 of Fig. 6.

Fig. 8 is a detached elevational view showing the inner side of a two piece tool carrying ring with rollers thereon and fragments of an externally toothed ring gear attached thereto.

Fig. 9 is a sectional view, with parts in elevation, of said two piece frame ring taken substantially on broken line 9—9 of Fig. 8.

Fig. 10 is a view partly in plan and partly in section taken substantially on broken line 10—10 of Fig. 4 and showing the tool feeding means and a fragment of a striker plate by which it is operated.

Fig. 11 is a detached plan view of a pipe clamping jaw and cam slide therefor.

Fig. 12 is a view partly in section and partly in elevation of said pipe clamping jaw, taken substantially on broken line 12—12 of Fig. 11, the cam slide being shown in elevation.

Fig. 13 is a side elevation of a pipe cutter tool and a fragment of a supporting arm therefor.

Fig. 14 is a front view of the cutting tool and arm shown in Fig. 14.

Fig. 15 is a fragmentary sectional view illustrating the manner in which the tool shown in Figs. 13 and 14 will bevel cut the end portions of a pipe to which it is applied.

Fig. 16 is a fragmentary side view, with parts broken away showing a part-off tool applied to the tool carrying arm for squarely cutting off a pipe or providing an annular groove in the same.

Like reference numerals indicated like parts throughout the several views.

This pipe cutter comprises a frame ring, which for purpose of illustration, is herein disclosed as being formed of two semi-circular parts 15 and 16. However, it will be understood that this frame ring could be of one piece construction or could be formed of more than two pieces but is preferably formed of at least two annular sections which are detachable, at least at one point, to facilitate placing said ring over a pipe from the side of the pipe in instances where it is impossible or not feasible to pass the pipe endwise through the ring or pass the ring over an end of the pipe.

The two frame ring sections 15 and 16 have mating hinge brackets 17 and 18 integrally formed at the end portions of the ring sections shown at the left in Figs. 2 and 6 and said hinge brackets are connected by a pivot pin 19. The end portions of the frame ring sections 15 and 16 shown at the right in Figs. 2 and 6 and at the left in Fig. 1 have opposed flanges 20 and 21 respectively and these flanges are detachably secured together by bolt 22. Also preferably a dowel pin 23 is carried by one of the flanges 21 and fits into a hole 24 in the other flange 20 to insure accurate positioning of the two frame ring sections 15 and 16 when they are attached together.

The sides of the frame ring sections 15 and 16 shown in Figs. 2 and 6 are provided with preferably three radial grooves 25 which are equidistantly spaced angularly and each of which is adapted to receive a flat shank 26 of a pipe gripping jaw which has a toothed gripping member 27 on its inner end. Spaced apart cam follower shoe receiving holes 26' are provided in each shank 26.

The sides of the frame ring sections 15 and 16 shown in Fig. 6 are further provided with relatively wide arcuate cam plate receiving grooves 28 of less depth than the radial grooves 25. The radial grooves 25 extend across the cam plate receiving grooves 28. Two flat arcuate cam plate sections 30 and 31, Figs. 2, 3 and 5, are operatively disposed within the grooves 28 and extend across the shanks 26 of the pipe gripping jaws. Preferably one cam plate section 30 is greater than a semi-circle and the other cam plate section 31 is less than a semicircle for reasons hereinafter explained. The outer annular wall of the cam plate receiving groove 28 in frame ring section 15 is relieved as shown at 32 in Fig. 6 to facilitate inserting the longer cam plate section 30 into the cam plate receiving groove 28 and under an overhanging lip 33, Fig. 7, which serves as a retaining means for the outer marginal part of said cam plate section 30. A similar lip 33' is provided on cam plate section 31. The inner annular wall of the cam plate receiving groove 28 in frame ring section 16 is relieved as shown by 34 in Fig. 6 to provide clearance for the overhanging end of the longer cam plate section at the time the two frame ring sections 15 and 16 are being opened up to get them over a pipe or closed together after they have been placed over a pipe.

Three retainer plates 35 are secured by cap screws 36 to the frame ring members 15 and 16, see Fig. 2, at the locations of the pipe gripping jaws 26, 27. The retainer plates 35 overlap the inner marginal portions of the cam plate sections 30 and 31 and help to hold these cam plate sections and the pipe gripping jaws 26, 27 in properly assembled relation. Each retainer plate 35 has a clamping screw 36' which may be tightened against the adjacent cam plate to firmly clamp the cam plate down on the pipe gripping jaw which extends under it and securely hold the pipe gripping jaw against movement. Preferably the thickness of the shanks 26 of the pipe gripping jaws is slightly greater than the depth of the grooves in which they operate so that tightening of the screws 36' against the cam plates 30 and 31 holds these cam plates 30 and 31 immovable in directions transverse to their width. This clamping of the pipe gripping jaws is desirable in cutting heavy pipes and particularly when these pipes are of small diameter and the clamping jaws extend a substantial distance inwardly from the frame ring or have a long overhang.

The cam plate sections 30 and 31 have three relatively long cam slots 38 provided therein at equally spaced intervals angularly considered. The cam plate section 30 is made longer than the cam plate section 31 so that two of the cam plate slots 38 may be provided in the longer cam plate section 30 and one slot 38 in the shorter section 31. A cam follower shoe 39 having an integral cylindrical stem 39' connects each pipe clamping jaw with the adjacent cam plate section 30 or 31. The stem 39' is received within one of the perforations 26' in the shank 26 of the pipe gripping jaw and the cam follower shoe 39 operates slidably in the adjacent cam slot 38. The two cam plate sections 30 and 31 operate as one unit and rotary adjustment of these two cam plate sections relative to the frame ring 15, 16 will radially adjust the pipe gripping jaws 26, 27. The outer peripheral portions of the cam plate sections 30 and 31 are held in place by the overhanging lip members 33 and 33' and a removable plate 40 is provided at the location 32 where the flange 33 is relieved or cut away to serve as removable hold down means at this location.

Providing two or more longitudinally spaced apart perforations 26' in the shank 26 of each pipe gripping jaw increases the possible range of adjustment of these jaws beyond the travel provided by each cam slot 38 by making it possible to use the cam followers 39, 39' in different perforations 26', depending on the size of the pipe being worked on. Adjustment of the cam followers 39, 39' in the perforations 26' is facilitated by providing in the outer sides of the cam plates 30 and 31, over each cam slot 38, a circular recess 105 deep enough to intersect the cam slot and form an opening 106 through which a cam follower 39, 39' may be inserted and removed. Preferably a cover plate 107, of slightly greater size than a half circle, is rotatively mounted by a centrally positioned screw 108 in each recess 105 so that it can be rotatively moved to either cover or uncover the opening 106. All of the cover plates 107 are shown in an open position in Fig. 2.

The cam ring 30, 31 may be quickly and easily moved rotatively without using the screw 45 when the pins 48 are disengaged from the notches 51 and the screw 45 may be used in the final clamping of the pipe jaws on a pipe. The pairs of notches 51 are spaced at intervals in the flanges 52 to take care of the relatively great amount of cam plate adjustment required by the relatively long cam slots 38.

The sides of the frame ring sections 15 and 16 opposite to the one which receives the cam plate 30, 31 have annular recesses 53, Fig. 7, to receive a tool carrying ring which is made up of two semi-circular sections 54 and 55, Figs. 1, 8 and 9. A plurality of rollers 56, Fig. 9, are mounted on each tool carrying ring section 54 and 55 by shoulder bolts 57 having eccentric bearing members 57'. Preferably six rollers 56 are provided at equidistantly spaced intervals. The rollers 56 roll in a channel shaped track formed by two semi-circular track sections 58 and 59, Figs. 3 and 7, which are secured by screws 60 to the respective frame ring sections 15 and 16. The eccentric shoulder bolts 57, 57' facilitate assembly and make possible enough radial adjustment of the rollers 56 to allow centering of the tool carrying ring and expanding of the rollers 56 firmly enough against the track 58, 59 to prevent lost motion and chattering and to insure better work.

Ring gear supporting flanges 61 and 62, Figs. 8 and 9, are provided respectively on the inner side of each tool carrying ring section 54 and 55 and two externally toothed ring gear sections 63 and 64 are supported on and secured to these flanges 61 and 62. A driving pinion 65, Fig. 3, meshes with the ring gear formed by sections 63 and 64. The pinion 65 is disposed within a housing 66 which is integral with the frame ring section 15 and said pinion 65 is rigidly secured to a short shaft 67 which is journaled in bearing means 68 in housing 66. An end portion of the shaft 67, external to the housing 66, is preferably square or otherwise suitably shaped so that an electric drill or other power transmitting device may be readily engaged therewith for driving the tool carrying ring 54, 55. A snap ring 69 is provided at the end of the housing 66 shown at the left in Fig. 3 to retain the bearing means 68 in place. A cover plate 70 is provided at the opposite end of the housing 66 to close and seal the same against entrance of dirt and leakage of lubricant.

Two sealing rings 71 and 72, Figs. 1 and 3, are secured by screws 73 to the frame rings 15 and 16 and overlap annularly grooved edge portions 74 of the tool carrying ring sections 54 and 55. Felt rings 71' and 72' are respectively provided under the sealing rings 71 and 72 to exclude foreign matter and prevent loss of lubricant.

The tool carrying ring sections 54 and 55 are rigidly secured together by screws 75 which extend through mating lug or flange members 76, see Fig. 1, on the outer sides of said ring sections 54 and 55. The two ring sections 54 and 55 normally function as a one piece rigid ring but when the screws 75 are removed these ring sections 54 and 55 may be spread apart along with the frame ring sections 15 and 16 to facilitate applying the tool to or removing it from a pipe. Obviously the two ring sections 54 and 55 will function as a single ring member if they are closely confined in the frame ring members 15 and 16 but are not attached together as by the screws 75 and lugs 76.

A tool carrying bracket 77 is secured, as by bolts 78 to the tool carrying ring section 54. A curved tool carrying arm 79 is pivotally connected by a bolt 80 with the bracket 77. A suitable pipe cutting tool 81 is removably attached as by screws 81' to the outer end portion of the tool 79. Obviously the tool 81 may be replaced by tools of different shapes, as hereinafter explained. The tool arm 79 operates under compression, that is the tool 81 is pushed rather than being pulled in its cutting operation. The forward face of the tool 81 is beveled so that the tool will cut but will not tend, to too great an extent, to draw itself into the work. Preferably the tool 81 has a squared cutting tip or point 81a which will cut a groove in the pipe to which it is applied and said tool is provided, above the point 81a with symmetrical expanding beveled cutting edges which will bevel the edges of the groove cut by the part 81a. These beveled cutting edges are numbered 81b in Fig. 14. The tool 81, when thus shaped will provide beveled edges 111 on the cut ends of pipe 110, see Fig. 15, and these beveled ends may be efficiently joined by welding by first providing within the pipe pieces a scarfing ring 112 and then using welding rod to fill the external annular V-shaped groove.

Preferably the tool carrying end portion of the tool arm 79, see Fig. 16, is provided with a slot 113 which will receive and hold a part-off tool 114. The part-off tool 114 is clamped in place by a cross bar 115 held by screws 116. The screws 116 are duplicates of the screws 81' shown in Figs. 13 and 14. The part-off tool 114 is relatively narrow and flat and this tool can be used to squarely cut off the ends of pipe and can also be used to form annular grooves adjacent the ends of pipe, grooves of this type being used in the joining of pipe in some instances, as where leaded joints are provided.

The means for positioning and automatically feeding the tool into the work is best shown in Figs. 1, 2, 4 and 10. This tool positioning and feeding means comprises a tubular tool slide 82 having its inner end portion provided with a transverse groove 82' which receives a pivot pin 83 that is rigid with the tool carrying arm 79. The tool slide 82 is slidably disposed within a tubular housing member 84. The housing member 84 has integral flanges 85, Fig. 1, which are rigidly secured by cap screws or bolts 86 to the section 54 of the tool carrying ring. The outer end portion 84' of the housing 84 is of expanded size to provide room for a feed screw 86 and operating means therefor. The feed screw 86 is threaded into the tool slide 82 so that rotation of the feed screw will longitudinally move the tool slide 82. A thrust block 87 is rigidly secured to the outer end portion of the tool slide housing 84 within the expanded portion 84' thereof and the feed screw 86 extends through this thrust block 87. A rigidly mounted thrust collar 88 on the feed screw 86 bears against the inner side of the thrust block 87. A ratchet wheel 90 is fixedly secured, by a cross pin 91, to the feed screw 86 outwardly from the thrust block 87. A pivot plate 91 is mounted for oscillation on an outwardly extending hub portion of the ratchet wheel 90. A spring pressed pawl 92 is secured by a pivot screw 93 to the pivot plate 91 and has a tooth 92' which engages the ratchet wheel 90. A disc shaped feed handle 94 is secured to the outer end portion of the feed screw 86 in spaced relation from the pivot plate 91. A torsion spring 95 is provided between the feed handle 94 and the pivot plate 91. One end portion of the spring 95 is attached to the pivot plate 91 and the other end portion of said spring 95 is attached to a lug 96, Fig. 2, on the interior of the expanded housing part 84' so that the spring 95 resiliently urges the pivot plate 91 in one direction into contact with an adjustable set screw 97 which functions as a stop member.

The feed handle 94 has a crank knob 98 secured thereto in outwardly spaced relation from the axis of the feed screw 86. By applying the finger to the end 92a of the pawl 92 said pawl may be released from the ratchet wheel 90 while the feed handle 94 and knob 98 and feed screw 86 are rapidly rotated to position the cutter 81 in contact with the work or to retract said cutter 81. A striker plate 100, Figs. 1, 2, 6 and 10 is fixedly but adjustably secured to the frame ring 15, 16, as by attaching it to the pinion housing 66, in the path of movement of the pivot plate 91. As shown in Fig. 10, the striker plate 100 may have a slot 101 through which passes a screw 102 that is threaded into the housing 66. By loosening the screw 102 the striker plate may be moved toward or away from the path of movement of the pivot plate 91 to provide for a greater or less amount of angular movement of the pivot plate each time it contacts the striker plate 100.

The initial positioning of the pivot plate 91 can also be varied by adjusting the stop screw 97 and this will vary the amount of rotary movement imparted to the feed screw 86 at each oscillation of the pivot plate 91. Each time the pivot plate 91 moves past the striker plate 100 the tool is advanced a predetermined distance toward the work. The tool may thus be fed at any desired rate, depending on the character of the material being cut.

In the use of this pipe cutting tool, when the several rings are to be opened up preparatory to placing them on a pipe, the cam ring sections are rotatively adjusted until two adjoining ends thereof are aligned with the frame ring pivot pin 19. The plane of separation of the tool carrying rings 54 and 54 is also aligned with the axis of the pivot pin 19 and the screws 75 and bolt 22 are removed. The two halves of the tool are then spread apart and placed over the pipe to be cut. The pipe gripping jaws 26, 27 are substantially fully retracted when the proper adjoining ends of the cam plates are aligned with the axis of pivot 19. The two spread apart parts of the tool are placed over the pipe and closed around the pipe and secured together by inserting screws 75 and bolt 22. In Fig. 1 a pipe 110 to which the tool is being applied is indicated by dot and dash lines and the gripping jaws 26, 27 are shown in retracted position relative to this pipe. When the gripping jaws are moved inwardly to contact the pipe they are self centering and will center the tool on the pipe and firmly grip the pipe. With the tool 81 properly engaging the pipe and power applied to the shaft 67 the tool carrying ring and tool will be rotated around the pipe while the tool is fed inwardly to cut off the pipe.

The foregoing description and accompanying drawings clearly disclosed a preferred embodiment of this invention but it will be understood that this disclosure is merely illustrative and that such changes may be made as are fairly within the scope of the following claims.

We claim:

1. In a pipe cutter, a frame ring formed of a plurality of sections; a tool carrying ring formed of a plurality of sections and rotatively supported within said frame ring; an annular cam plate formed of a plurality of sections and adjustably disposed within said frame ring; detachable means securing the sections of said frame ring together, whereby said two rings and said cam plate may be applied to a pipe from the side of the pipe; pipe clamping jaws carried by said frame ring; means operated by said annular cam plate, whereby said jaws are radially moved into and out of clamping positions; driving means interconnecting said two rings adapted to rotate said tool carrying ring relative to said frame ring; a pipe cutting tool carried by said tool carrying ring; tool feeding devices carried by said tool carrying ring and connected with said pipe cutting tool; and fixed means on said frame ring positioned in the path of said tool feeding devices, whereby said pipe cutting tool is fed radially inward in response to relative rotation of said two rings.

2. In a pipe cutter, a frame ring formed of at least two sections; a tool carrying ring formed of at least two sections and rotatively supported by said frame ring; detachable means securing the sections of said frame ring together; an annular cam plate formed of a plurality of sections and adjustably disposed within said frame ring; radially movable pipe clamping jaws carried by said frame ring and connected with said annular cam plate, whereby said jaws are radially moved by adjustment of said cam plate into and out of self centering engagement with a pipe around which said rings and cam plate extend; driving means interconnecting said two rings adapted to rotate said tool carrying ring relative to said frame ring; a pipe cutting tool carried by said tool carrying ring; tool feeding devices carried by said tool carrying ring and connected with said pipe cutting tool; and fixed means on said frame ring positioned in the path of said tool feeding devices, whereby said pipe cutting tool may be progressively fed radially inward in response to relative rotation of said two rings.

3. In a pipe cutter, a frame ring formed of two sections; means pivotally securing together two adjoining end portions of said frame ring sections; means detachably connecting the other two adjoining end portions of said two frame ring sections; a tool carrying ring formed of two sections; detachable means securing together both adjoining end portions of said tool carrying ring sections; roller means rotatively mounting said tool carrying ring in said frame ring; pipe clamping jaws carried by said frame ring; jaw operating means connected with said jaws; driving means connected with said tool carrying ring; a pipe cutting tool carried by said tool carrying ring; tool feeding means connected with said tool; and devices responsive to rotation of said tool carrying ring for feeding said pipe cutting tool radially inward.

4. In a pipe cutter, a frame ring formed of two sections; means pivotally connecting together two adjoining end portions of said two frame ring sections; means detachably connecting together the other two adjoining end portions of said two frame ring sections; a tool carrying ring formed of two sections; detachable means securing together both adjoining end portions of said tool carrying ring sections; roller means rotatively mounting said tool carrying ring in said frame ring; an annular cam plate supported for rotative adjustment by said frame ring and formed of two sections; radially movable pipe clamping jaws carried by said frame ring and connected with said cam plate for self centering pipe clamping radial adjustment by said cam plate; driving means interconnecting said two rings adapted to rotate said tool carrying ring relative to said frame ring; a pipe cutting tool carried by said tool carrying ring; tool feeding devices carried by said tool carrying ring and connected with said pipe cutting tool; and fixed tool feeding devices operating means mounted on said frame ring in the path of movement of said tool feeding devices.

5. In a pipe cutter, a frame ring formed of at least two sections detachably connected together at least at one end for application sidewise over a pipe; an annular track provided within said frame ring; a tool carrying ring formed of at least two sections; rollers rotatively mounted on said tool carrying ring and positioned to run in said track rotatively supporting said tool carrying ring in said frame ring; an externally toothed ring gear rigid with said tool carrying ring; a pinion rotatively supported by said frame ring and meshing with said ring gear; a power transmission shaft connected with said pinion; an annular cam plate rotatively adjustably disposed within said frame ring and former of at least two sections; cam plate adjusting means interconnecting said cam plate and said frame ring; pipe clamping jaws carried by said frame ring and connected with said annular cam plate, whereby said jaws are radially adjusted by rotatively adjusting said cam plate relative to said frame ring; a pipe cutting tool carried by said tool carrying ring; and tool feeding devices connected with said tool.

6. In a pipe cutter, a frame ring formed of at least two sections detachably connected at least at one end for application sidewise over a pipe; an annular track provided within said frame ring; a tool carrying ring formed of at least two sections; rollers carried by said tool carrying ring and positioned to run in said track and rotatively supporting said tool carrying ring; an externally toothed ring gear rigid with said tool carrying ring; a pinion rotatively supported by said frame ring and meshing with said ring gear; a power transmission shaft connected with said pinion; an annular cam plate rotatively adjustably disposed within said frame ring and formed of at least two sections; a cam adjusting bracket rigid with said cam plate; a nut pivotally mounted on said bracket; an adjusting screw threaded through said nut; abutment means on said frame ring supporting one end portion of said adjusting screw, whereby said cam plate may be rotatively adjusted by turning said screw; pipe clamping jaws carried by said frame ring and connected with said annular cam plate, whereby said jaws are radially adjusted by rotatively adjusting said cam plate relative to said frame ring; a pipe cutting tool carried by said tool carrying ring; and tool feeding devices connected with said pipe cutting tool.

References Cited in the file of this patent
UNITED STATES PATENTS

| | | |
|---|---|---|
| 514,577 | Waring | Feb. 13, 1894 |
| 888,724 | Moore | May 26, 1908 |
| 1,029,265 | Borden | June 11, 1912 |
| 1,097,152 | Wagner | May 19, 1914 |
| 1,310,957 | Nonneman | July 22, 1919 |
| 1,325,173 | Shirlow et al. | Dec. 16, 1919 |
| 1,493,452 | Jardine | May 6, 1924 |
| 1,985,541 | Hoefer | Dec. 25, 1934 |
| 2,567,833 | Warren et al. | Sept. 11, 1951 |